(12) United States Patent
Oomen et al.

(10) Patent No.: US 11,857,081 B2
(45) Date of Patent: Jan. 2, 2024

(54) LOAD BEARING SURFACE WITH KINETIC ENERGY MANAGEMENT FABRIC

(71) Applicant: Illinois Tool Works Inc., Glenview, IL (US)

(72) Inventors: Craig Martin Oomen, Lowell, MI (US); Randy James Sayers, Howard City, MI (US); Manfred Mueller, Nuremberg (DE)

(73) Assignee: Illinois Tool Works Inc., Glenview, IL (US)

( * ) Notice: Subject to any disclaimer, the term of this patent is extended or adjusted under 35 U.S.C. 154(b) by 307 days.

(21) Appl. No.: 17/265,461

(22) PCT Filed: Aug. 1, 2019

(86) PCT No.: PCT/US2019/044693
§ 371 (c)(1),
(2) Date: Feb. 2, 2021

(87) PCT Pub. No.: WO2020/028679
PCT Pub. Date: Feb. 6, 2020

(65) Prior Publication Data
US 2021/0227992 A1    Jul. 29, 2021

Related U.S. Application Data

(60) Provisional application No. 62/714,169, filed on Aug. 3, 2018.

(51) Int. Cl.
*A47C 7/28* (2006.01)
*A47C 31/02* (2006.01)
*D03D 1/00* (2006.01)

(52) U.S. Cl.
CPC ............ *A47C 31/023* (2013.01); *A47C 7/282* (2013.01); *D03D 1/00* (2013.01);
(Continued)

(58) Field of Classification Search
CPC ...................................................... A47C 7/282
(Continued)

(56) References Cited

U.S. PATENT DOCUMENTS 94,553 A * 9/1869 Bingham ............... A47C 31/02
5/403
662,647 A * 11/1900 Howe ...................... E06B 7/32
297/452.64
(Continued)

FOREIGN PATENT DOCUMENTS

CN         1429720 A     7/2003
CN         101137309 A   3/2008
(Continued)

OTHER PUBLICATIONS

International Search Report and Written Opinion for PCT/US2019/044693, dated Nov. 25, 2019 (10 pages).

*Primary Examiner* — Rodney B White
(74) *Attorney, Agent, or Firm* — Quarles & Brady LLP

(57) ABSTRACT

A load bearing surface includes a woven fabric surface and a carrier (18) overmolded onto the fabric surface. Portions of the woven fabric are bonded to the carriers (18) o as to remain fixed relative to the carrier during normal loading conditions and during abnormally high loading conditions. Other portions (14) of the woven fabric are bonded to the carrier so as to remain fixed relative to the carrier during normal loading conditions and to move or slip within the carrier, or to rupture, during abnormally high loading conditions.

22 Claims, 3 Drawing Sheets

(52) U.S. Cl.
CPC .... *D10B 2331/021* (2013.01); *D10B 2331/04* (2013.01); *D10B 2401/062* (2013.01)

(58) Field of Classification Search
USPC ........................................ 297/452.56, 452.63
See application file for complete search history.

(56) References Cited

U.S. PATENT DOCUMENTS

| | | | | |
|---|---|---|---|---|
| 4,192,547 A * | 3/1980 | Geier | ................... | A47C 7/02 297/452.63 X |
| 4,463,465 A * | 8/1984 | Parker | ................... | A47C 7/18 5/954 |
| 4,606,441 A | 8/1986 | Markov | | |
| 4,750,443 A * | 6/1988 | Blaustein | ................ | B32B 5/26 428/920 |
| 4,869,554 A * | 9/1989 | Abu-Isa | ................ | A47C 7/282 297/452.56 |
| 5,013,089 A * | 5/1991 | Abu-Isa | ................ | B60N 2/7094 297/452.56 X |
| 6,540,950 B1 * | 4/2003 | Coffield | ............ | B29C 45/14336 297/452.64 |
| 6,842,959 B2 * | 1/2005 | Coffield | ................ | A47C 21/022 29/451 |
| 7,111,888 B1 * | 9/2006 | Dehart | ................... | B60N 2/885 296/68.1 |
| 7,159,293 B2 * | 1/2007 | Coffield | ................ | A47C 31/023 29/451 |
| 7,406,733 B2 * | 8/2008 | Coffield | ................ | A47C 7/282 297/452.56 |
| 7,441,758 B2 * | 10/2008 | Coffield | ................... | B29D 7/01 267/142 |
| 7,647,714 B2 * | 1/2010 | Coffield | ............ | B29C 45/14065 297/452.56 X |
| 8,080,303 B1 * | 12/2011 | Dehart | ................ | B60N 2/7011 428/116 |
| 8,465,007 B2 * | 6/2013 | Coffield | ................ | A47C 31/023 267/143 |
| 9,335,128 B2 * | 5/2016 | Wemhoener | ............. | F41H 5/08 |
| 9,759,526 B2 * | 9/2017 | Wemhoener | ............. | A47C 1/00 |
| 10,111,535 B2 * | 10/2018 | Coffield | ................ | A47C 7/282 |
| 10,330,443 B2 * | 6/2019 | Wemhoener | ............. | A47C 7/62 |
| 10,874,220 B2 * | 12/2020 | Aldrich | ................ | A47C 31/006 |
| 10,967,771 B2 * | 4/2021 | Seibold | ................ | B60N 2/7011 |
| 11,134,792 B2 * | 10/2021 | Case | ................ | A47C 31/023 |
| 11,452,380 B2 * | 9/2022 | Oomen | .................... | A47C 7/40 |
| 11,464,340 B2 * | 10/2022 | Oomen | ................ | B60N 2/7094 |
| 2006/0286359 A1 * | 12/2006 | Coffield | ................... | B29D 7/01 428/216 |
| 2010/0117430 A1 | 5/2010 | Moeseneder et al. | | |
| 2012/0247313 A1 * | 10/2012 | Peters | ...................... | A47C 3/04 89/36.01 |
| 2012/0248837 A1 * | 10/2012 | Peters | ...................... | F41H 5/08 89/36.02 |
| 2014/0015290 A1 * | 1/2014 | Saada | .................... | B64D 11/06 297/216.13 |
| 2017/0283071 A1 | 10/2017 | Velasco | | |
| 2017/0320579 A1 | 11/2017 | Velasco | | |
| 2020/0039399 A1 * | 2/2020 | Oomen | ................ | B60N 2/5891 |
| 2022/0039554 A1 * | 2/2022 | Oomen | ............ | B29C 45/14336 |

FOREIGN PATENT DOCUMENTS

| | | |
|---|---|---|
| CN | 103476674 A | 12/2013 |
| CN | 103958267 A | 7/2014 |
| DE | 202005012230 U1 | 12/2005 |

* cited by examiner

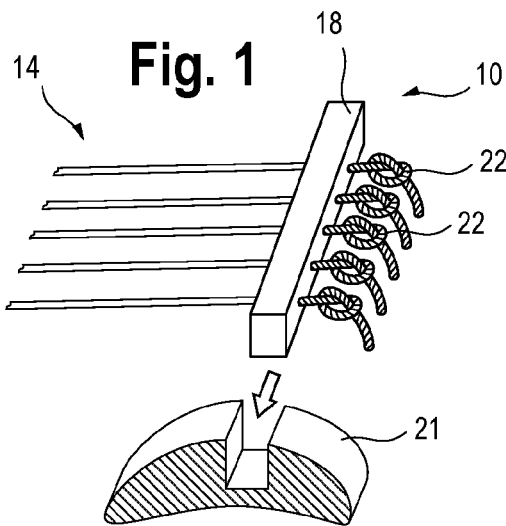
Fig. 1
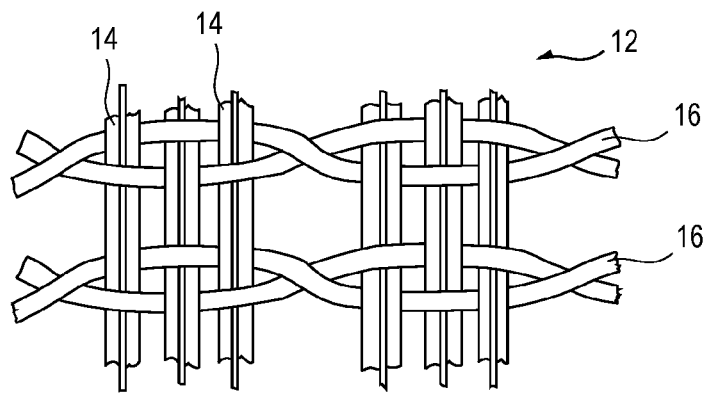
Fig. 2
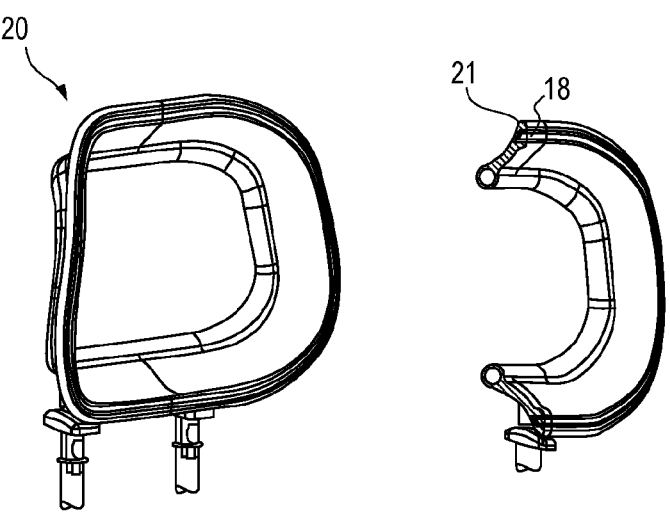
Fig. 3
Fig. 4A

Force Deflect Energy Curves

LOAD BEARING SURFACE WITH KINETIC ENERGY MANAGEMENT FABRIC

The present application represents the United States National Stage of International Application No. PCT/US2019/044693, filed Aug. 1, 2019, which claims priority to U.S. Provisional Patent Application No. 62/714,169, filed Aug. 3, 2018, the entire contents of which are incorporated by reference in their entirety.

BACKGROUND

The present invention relates to a load bearing surface, such as a seat bottom surface, back surface, or headrest, and more particularly to a load bearing surface having kinetic energy management features incorporated into the surface fabric fibers.

There are continuing efforts to develop new and improved load bearing surfaces for seating. Efforts are focused on obtaining a durable, low mass, comfortable and inexpensive load bearing surface for vehicle seating. Efforts are also focused on safety; that is, the load bearing or seating surface should be designed to accommodate increased safety requirements in vehicles, generally.

In the context of seating safety, current vehicle seating surfaces are formed from foam and other resilient materials. These materials exhibit 100 percent or nearly 100 percent rebound or bounce in impact situations. That is, little to no energy is absorbed by the seating surface when subjected to high acceleration G-forces such as during crash loads. This has been shown when benchmarking steel suspension type seats as functional suspensions or other class A polymer-based suspension seat surfaces that provide a class A appearance.

Current vehicle seating is designed for comfort and robustness and not energy absorption. In a typical design, a steel structure, usually a C section and stamped components are welded together to form a seating structure subassembly. The load paths from the occupant mass during a crash event travel through the steel seat structure to the main vehicle roll cage/body structure.

A steel suspension layer that is below the occupant is added to bridge the distance between seat structure beams. The steel suspension offers some hammocking between structure pillars in the seat structure to enhance comfort characteristics.

Foam, such as polyurethane (PU) is used to cover the steel structure and suspension and offers force vs. deflection compliance during product use for comfort. In crash loading conditions the foam protects occupants from hard points deeper within the seat assembly. In a typical configuration, the foam layer is covered with a trim cover that may include leather, vinyl, and/or polyester textile fabric, a lofted fabric breathable layer and felt or a bonded layer to prevent wrinkling. These layers are used generally to manage comfort requirements and G-forces during a crash event to control the occupant position before, during and immediately after the event.

Because current fabric suspensions are designed for comfort and robustness and not energy absorption, the filaments used in the fabric are designed to not exceed the yield point of the resin (used to form the fabric) as a result of any applied stresses. Since the thermoplastic elastomer (TPE) monofilaments (the warp or longitudinal yarns) and polyester yarns (the weft or transverse yarns) are elastic in nature, a rebound effect is exhibited when an impact load is applied. This is true for orientated and non-orientated filaments. Moreover, the filament diameter, resin grade, and weave style are all selected so that the fabric generally, and the individual filaments do not break during loading.

When TPE fibers that are elastic in nature are loaded at high speed and are designed to not break/or fail, impact rebound is an expected result. Rebound or bouncing of an impact is not desired for crash energy absorption.

Moreover, fabric fiber that is bonded to a suspension frame is limited with respect to some designs that use shark teeth to bite into the fabric. The shark teeth are molded on the suspension frame and engage the fabric during final assembly of the suspension subassembly. Poor bonding in this area can result in complete fabric slip and loss of primary function. Design limitations are also present in that bonding between the frame (the shark teeth) and the fabric is a function of surface area (bite area) needed to hold the fabric. This is a styling limitation because of the larger frame silhouette required to house the rows of shark teeth to withstand, for example, a 20 g crash load.

Accordingly, there is a need for a fabric/fiber configuration for a load bearing surface that has kinetic energy management features. Desirably, such features are incorporated into the load bearing surface fabric fibers. More desirably still, such a load bearing surface provides a comfortable seating surface with balanced tension properties and perpendicular loading displacement that limits long term creep over time and has elastic stretch and rebound during normal use, but absorbs energy during high abnormal loading conditions, such as those encountered in crash events.

SUMMARY

In one aspect, a load bearing surface includes a woven fabric formed from first and second fibers. At least some of the first fibers are substantially inelastic. A carrier is configured to support the woven fabric. The carrier is overmolded onto the woven fabric to secure the fabric to the carrier. At least some of the first fibers are bonded to the carrier so as to remain fixed relative to the carrier during normal loading conditions and during abnormally high loading conditions. Others of the first fibers are bonded to the carrier so as to remain fixed relative to the carrier during normal loading conditions and to move or slip within the carrier during abnormally high loading conditions. The load bearing surface has kinetic energy management features that are incorporated into the load bearing surface fabric fibers.

In an embodiment, the first fibers are warp fibers and the second fibers are weft fibers. At least some of the first fibers are polymeric fibers. The polymeric fibers can be, for example, are polyester fibers. In an embodiment, at least some of the first fibers are formed from an aramid or are fibers that have a sheath covering the fibers that is formed from a non-bonding material, such as an aramid. In an embodiment, at least some of the second fibers are formed from a block copolymer.

The first fibers can have a linear elasticity of no more than about 5 percent and the second fibers can have a linear elasticity of about 15-20%.

In an embodiment, the first and second fibers are chemically bonded to the carrier. Alternately, the first and second fibers can be are mechanically bonded to the carrier. In an embodiment, the first fibers that are bonded to the carrier to move or slip within the carrier during abnormally high loading conditions include a mechanical stop on the fibers beyond the carrier. A mechanical stop can be, for example, an enlarged portion of the fiber. The mechanical stop can be a knot in the fiber.

In an aspect, a load bearing surface includes a woven fabric surface and a carrier overmolded onto the fabric surface. Portions of the woven fabric are bonded to the carrier so as to remain fixed relative to the carrier during normal loading conditions and during abnormally high loading conditions. Other portions of the woven fabric are bonded to the carrier so as to remain fixed relative to the carrier during normal loading conditions and to move or slip within the carrier during abnormally high loading conditions. Bonding can be, for example, chemical and/or mechanical bonding.

In an embodiment, the portions of the woven fabric that are bonded to the carrier to move or slip within the carrier during abnormally high loading conditions are formed from substantially inelastic fibers having a linear elasticity of no more than about 5%. The inelastic fibers can be polyester fibers. The polyester fibers can be formed from an aramid or have a sheath covering the fibers that is formed from an aramid. The first fibers can have a linear elasticity of no more than about 5 percent and the second fibers can have a linear elasticity of about 15-20%.

In another aspect, a load bearing surface includes a woven fabric surface and a carrier overmolded onto the fabric surface. Portions of the woven fabric are bonded to the carrier so as to remain fixed relative to the carrier during normal loading conditions and during abnormally high loading conditions. Other portions of the woven fabric are bonded to the carrier so as to remain fixed relative to the carrier during normal loading conditions and to rupture during abnormally high loading conditions. In an embodiment, the portions of the load bearing surface that rupture during abnormally high loading conditions are configured to rupture at different loading conditions than other portions of the load bearing.

In an embodiment, the carrier is configured for mounting in a seat bottom, a seat back or a head rest.

Various embodiments of the load bearing surface provide a comfortable seating or resting surface with balanced tension properties and perpendicular loading displacement that limits long term creep over time. Such load bearing surfaces have elastic stretch and rebound during normal use, but absorb energy during high abnormal loading conditions, such as those encountered in crash events.

These and other features and advantages of the present device will be apparent from the following description, taken in conjunction with the accompanying sheets of drawings, and in conjunction with the appended claims.

BRIEF DESCRIPTION OF THE DRAWINGS

The benefits and advantages of the present embodiments will become more readily apparent to those of ordinary skill in the relevant art after reviewing the following detailed description and accompanying drawings, wherein:

FIG. 1 is a diagrammatic illustration of a portion of an embodiment of a load bearing surface with kinetic energy management;

FIG. 2 illustrates an example of a woven fabric for use in the load bearing surface;

FIG. 3 is an example of a vehicle headrest having a load bearing surface with kinetic energy management FIGS. 4A and 4B are sectional illustrations of the headrest of FIG. 3;

DETAILED DESCRIPTION

Figure 4B:
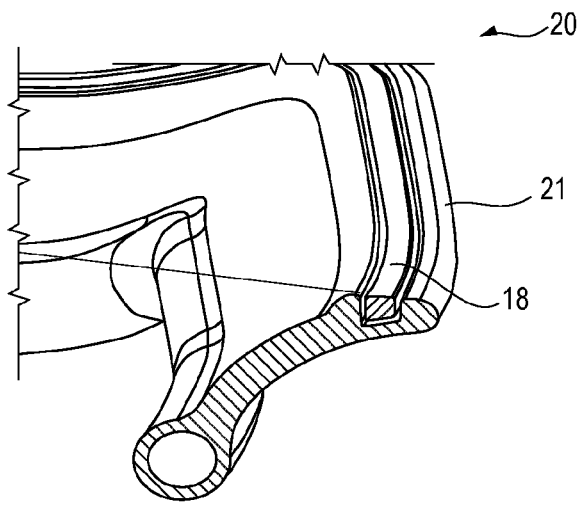
Figure 5:
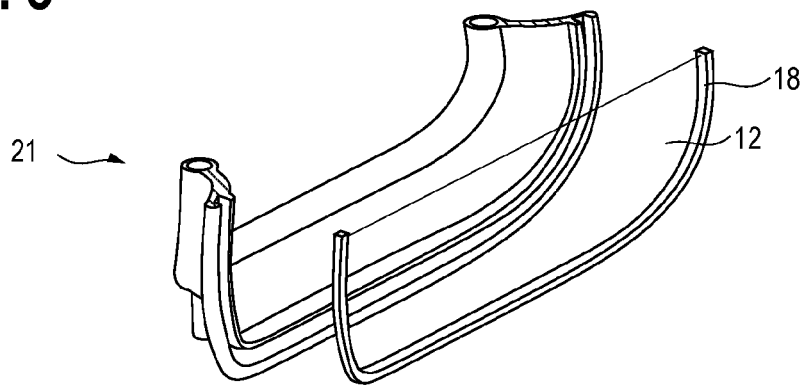
FIG. 5 is a graphic illustration of the load bearing surface, in a carrier, in an exploded view relative to the headrest frame.
Figure 6:
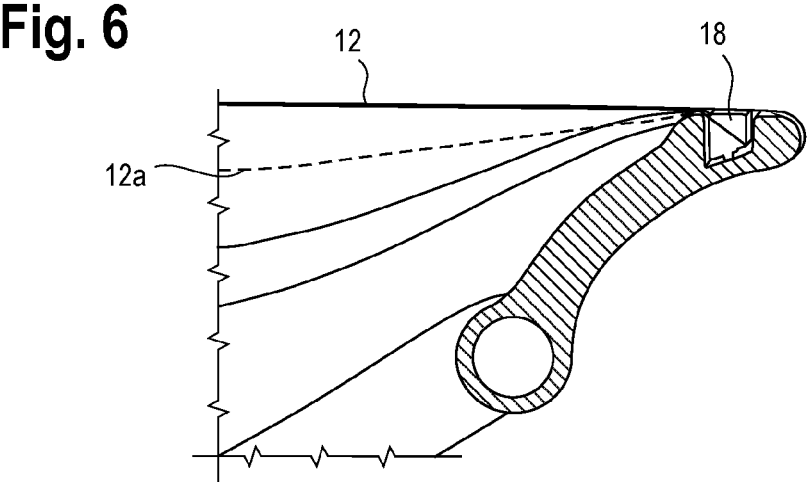
FIG. 6 is an enlarged, partial sectional view illustrating one way in which the fabric functions to absorb energy during a high abnormal loading condition.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Referring to the figures and in particular to FIGS. 1 and 2, there is shown a portion of an embodiment of a load bearing surface 10 having kinetic energy management features incorporated into the surface fabric 12 fibers. In the example shown in FIGS. 1 and 2, the fibers shown are the warp fibers or yarns 14 and weft fibers or yarns 16. The warp fibers 14 extend in the front-to-rear or top-to-bottom direction of a seat bottom surface or seat back surface, respectively. In some known seat surfaces, the warp fibers 14 are relatively non-elastic, whereas weft fibers 16 (see FIG. 2) are elastic. Warp fibers 14 can be formed from, for example, polyester yarn having a linear elasticity of no more than about 5 percent. Weft fibers 16 can be formed from, for example, a block copolymer mono-filament and can have a linear elasticity of about 15-20%.

In some known surfaces, the fabric 12 is stretched and overmolded directly into a carrier 18 to secure the fabric 12 to the structure, such as a seat bottom or back or a headrest 20, such as that illustrated in FIGS. 3-6. Typically, the carrier 18 is mounted to a frame 21 that is mounted to the structure. For purposes of the present disclosure, unless otherwise indicated, reference to carrier 18 is to the structure over which the fabric 12 is molded.

In overmolding, a chemical or mechanical bond is formed between the fabric fibers 14, 16 and the carrier 18 to permanently secure the fabric 12 in place in the carrier 18. That is, a chemical bond may be formed by a chemical reaction of the heated/molten carrier 18 material as it comes into contact with the fibers 14, 16, or a mechanical bond may be formed by the heated/molten carrier 18 material melting a portion (for example, an outer sheath) of the fibers 14, 16 and, when cooling, forming a bond of the two molten materials. Due to the nature of either the chemical or the mechanical bond, the fabric 12 is permanently secured in the carrier 18 and cannot loosen or move.

In an embodiment of a load bearing surface having kinetic energy management features incorporated into the surface fabric fibers 14, 16, some of the fibers, for example, weft fibers 16 (single-function fibers) are permanently secured in the carrier 18 by chemical or mechanical bonds with the carrier 18. However, others of the fibers, for example, warp fibers 14 (dual-function fibers) are bonded to the carrier 18 such that they do not move relative to the carrier 18 during normal loading conditions, but will move or slip within the carrier 18 during loading conditions that are greater than normal (e.g., abnormal) loading conditions. For example, such abnormal (high) loading conditions may occur during a crash event in which an occupant exerts a force into the surface 10 that is greater than that anticipated during normal use. In an embodiment, some or all of the warp fibers 14 are dual-function fibers and some or all the weft fibers 16 are single function fibers. It will, however, be understood that some of the warp fibers 14 may be single function fibers and that some of the weft fibers 16 may be dual-function fibers, and that in some cases, all of the fibers 14, 16 are dual-function fibers.

In an embodiment, the dual-function fibers 14 are designed to limit bonding to the carrier 18. That is, the dual-function fibers 14 are non-bonding or do not permanently chemically or mechanically bond to the carrier 18 and are able to slip within the carrier overmold when crash loads are applied. As the fabric 12 (surface) is loaded, the fibers 14 slip within the carrier 18, tension of the fabric 12 is reduced and the overall position of the fabric 12 surface changes (loosens, see for example the area indicated at 12a in FIG. 6) resulting in kinetic energy absorption. In an embodiment, the dual-function fibers 14 can be formed from or can have a sheath formed from a material that exhibits poor bonding to thermoplastics (thermoplastics being the principal material from which the carrier is molded). As such, as an abnormal load is applied to the fabric 12, the poor bonding dual-function fibers 14 will slip through the carrier 18 while the single-function fibers 16 will remain secured in the carrier 18. One known material that does not bond well with thermoplastic materials is an aramid material, such as certain nylon materials. Other suitable materials will be recognized by those skilled in the art.

In order to limit the amount of slip, in an embodiment, knots 22 (see FIG. 1) can be formed in the dual-function fibers 14 outside of the carrier 18 border so that the amount of slip is limited by a physical stop, e.g., an anchor, as the knot engages the carrier 18. The slip of the dual-function (un-bonded) fibers 14 can be further controlled by including intentional ripples or bends (not shown) within the dual-function fiber 14 as it lies within the carrier 18 overmolding. The ripples or bends increase the length of the dual-function fiber 14 travel and decrease the resistance of the dual-function fibers 14 to slip within the overmolded carrier 18.

In an embodiment, the dual-function fibers 14 can be configured to fail or rupture when subject to abnormally high loading conditions. As with the slippage configuration, the failure or rupture of certain fibers 14 (the dual-function fibers 14) will result in kinetic energy absorption as the tension of the fabric 12 is reduced and the overall position of the fabric 12 surface changes (loosens). It will be appreciated that when materials fail that are loaded in compression or tension, energy from applied loads are absorbed from the impactor, e.g., the seat occupant. The fibers 14 can be designed to nest the occupant during crash G forces and can be further designed to isolate occupants from touching hard points in the seating structure, while at the same time, the dual-function fibers 14 can be designed to break to provide energy absorption.

The dual-function fibers 14 that are designed to fail during a variety of occupant displacements into the seat surface can produce a staged fiber 14 failure to manage deceleration of the occupant. Staged failure or managed deceleration of some of the fibers 14 can be accomplished by varying the characteristics of the dual-function fibers 14 that are configured to fail and the fibers 16, if any, that are configured to remain intact. For example, staged failure or managed deceleration can be accomplished through material selection, e.g., aramids, stainless steel, and thermoplastic elastomer (TPE) polymers which all have permanent deformation properties, or energy absorption properties. The percentage of orientation of a polymer can facilitate staged failure or managed deceleration in that a polymer can be stressed beyond its original yield point for an enhanced performance level. The new working zone of such an orientated polymer is a stress induced crystallinity phase change from amorphous to aliphatic, similar to orienting nylon when manufacturing fishing line. The percentage of orientation controls the elongation and ultimate strength to a predictable level, which can be used to tune a fabric or suspension surface for peak crash load breakage to dissipate kinetic energy.

Varying the section diameter of the fibers 14 can be used to control the product strength and failure point. Slipping of fibers 14 though an anchoring component or carrier 18 and permanent deformation of the fibers 14 as discussed above can be used to absorb kinetic energy to facilitate staged failure or managed deceleration.

The composition of the fibers 14, e.g., the types, amounts and proportions of block copolymers can also be varied to achieve the desired characteristics of staged failure or managed deceleration. It is also contemplated that weakened regions can be formed or created in the fibers to influence failure (by loading) and manage deceleration.

Figure 7:
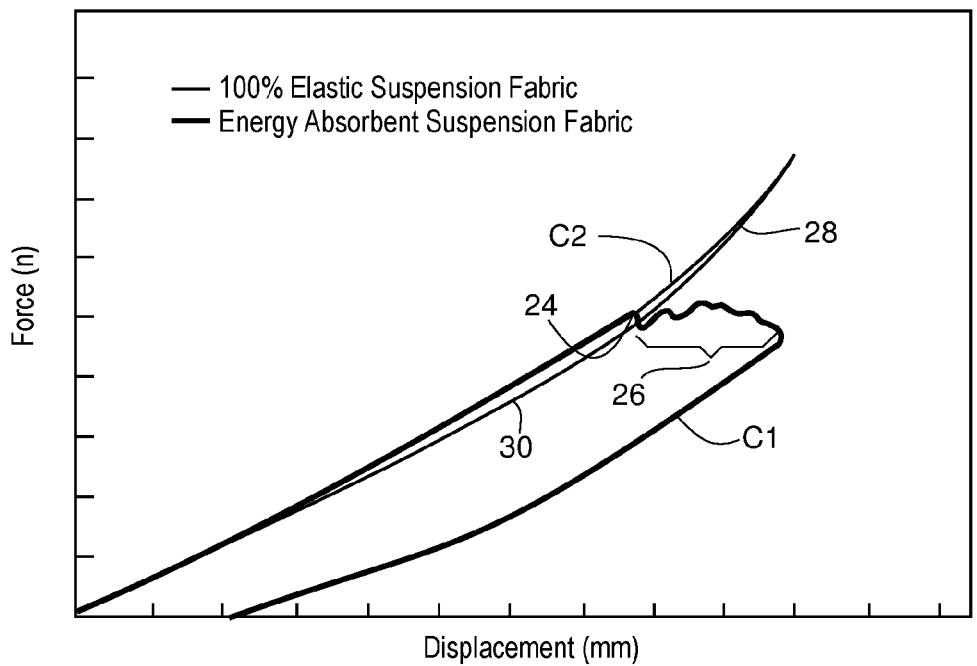
FIG. 7 are graphical illustrations of force vs. displacement curves during high abnormal loading conditions showing low energy absorption in curve C1 and high energy absorption in curve C2.
Figure 8:
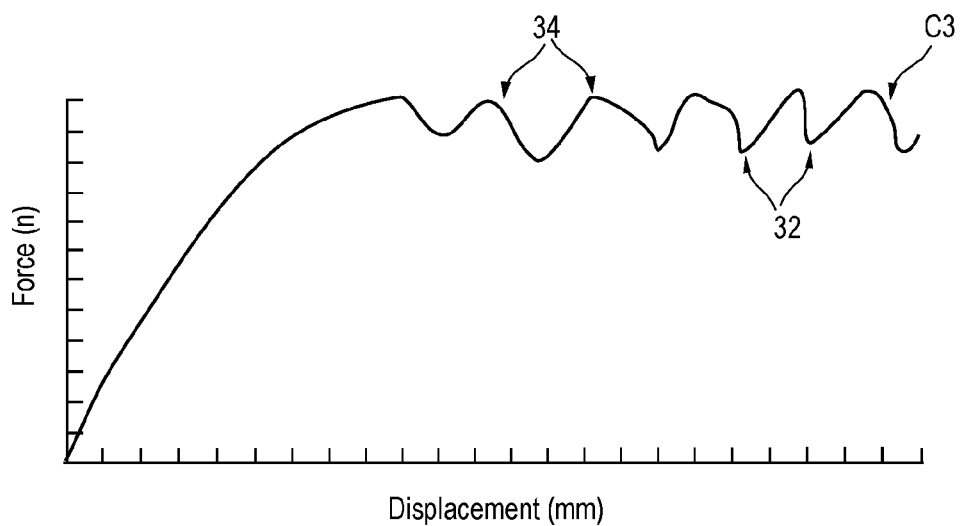
FIG. 8 is a graphical illustration of a force vs. displacement curve for a load bearing surface with kinetic energy management

FIGS. 7 and 8 graphically illustrate force vs. displacement curves during high abnormal loading conditions simulating vehicle crash conditions, in which the force in kilo-Newtons (kN) is shown on the vertical (y) axis and the displacement in centimeters is shown on the horizontal (x) axis.

Curve C1 in FIG. 7 illustrates a configuration for desirable energy absorption in that the surface absorbs a high strain rate load immediately, as indicated at 24, and maintains a load threshold throughout displacement, as indicated at 26, until all energy is absorbed. This curve is often referred to as a square F/D curve and illustrates an efficient transfer of energy. Curve C2, illustrates a less than desirable energy absorption curve because of the rebound or bounce, as indicated at 28, as energy is transferred to the load bearing surface 10, and back to the object exerting the load, as indicated at 30.

Curve C3, illustrated in FIG. 8, shows an energy absorption curve in which the dual-function fibers slip (or displace) within the carrier or in which the dual-function fibers break or rupture. The slippage or breaking in curve C3 is shown at the troughs, as indicated at 32, which are the points that indicate the times at which the fibers slip or rupture. While the curve C3 is not as smooth as that of the square curve C1, the fluctuations are much less dramatic than that of curve C2 and, in effect, smooth out the energy absorption, decreasing the peak forces as indicated at 34, reducing bounce or rebound, as indicated at 32, and making this configuration (the energy management fibers) a more desirable energy absorption scenario.

It has been found that in a load bearing surface having kinetic energy management features incorporated into the surface fabric fibers, the fibers or filaments within the suspension seat permanently displace with little to no rebound during high abnormal loading such as that seen during a crash event. The surface 10 can be configured such that some or all fibers in a specific zone of the seat slip to reduce tension or rupture as designed to reduce or eliminate rebound. The fibers 14 within the fabric 12 that slip or rupture absorb the crash energy imposed on the occupant, thereby keeping the energy from being re-introduced into the occupant as a rebound effect.

It will be appreciated that the difference between the static load of an occupant and the dynamic load at speed are significant. For example:

Static load of a 220 lbs. person at sea level=99.8Kg×9.8 m/s$^2$=978.04N, and

Dynamic Load of the same person (220 lbs.) at a speed of 64.3 kilometers per hour (about 40 mph)=220 lbs. man=10278 J=99.8Kg×9.8 m/s$^2$× 20 g=19560.8N.

As such, it will be appreciated that loads reaching 20 times higher in magnitude can be managed using a load bearing surface having kinetic energy management features incorporated into the surface fabric fibers to absorb the dynamic energy as compared to, and while accommodating the static user loads desired for comfort and product robustness.

The ruptured or partially ruptured surface fabric 12, as a whole, will exhibit less rebound or bounce compared to conventional suspension designs when loads are abnormally high or high velocity. The seat surface fabric 12 condition after high force or high velocity loading will exhibit less force deflection and may have a sagging appearance. This condition is known as permanent deformation and is visually apparent on engineering stress vs. strain curves for specific materials. The desired permanent deformation, such as by rupture or failure or slippage in the fabric 12 is achieved by fiber 14 filament shape and size, and by selecting materials that limit elongation relative to loading velocities. In this manner, rupture of known crash G loads will fail some of the fibers 14, and/or create permanent fiber 14 movement within the fiber 14 to carrier 18 attachment. The plastic property of elongation vs. load velocity is referred to as the plastic strain rate effect. During high speed loading of polymers, these polymers behave more rigidly and are more brittle when comparing 4 mm/min velocities vs. 48000 mm/min loading speeds. These factors may be taken into account when selecting polymer grades for the dual-function fiber 14 that fail during high speed and high loads.

The present load bearing surface 10 having kinetic energy management features incorporated into the surface fabric fibers 14 permits a balance between rebound for seating robustness and comfort, and the need to absorb energy due to high G force loads during a crash event for seat backs and head rests (for rear crash events), frontal impact (crash kinematic rebound for secondary impacts for seat backs and head rests, and for roll over impacts (seat bottom cushions, seat backs and head rests).

In the present disclosure, the words "a" or "an" are to be taken to include both the singular and the plural. Conversely, any reference to plural items shall, where appropriate, include the singular. It will be appreciated by those skilled in the art that the relative directional terms such as upper, lower, rearward, forward and the like are for explanatory purposes only and are not intended to limit the scope of the disclosure.

All patents or patent applications referred to herein, are hereby incorporated herein by reference, whether or not specifically done so within the text of this disclosure.

From the foregoing it will be observed that numerous modification and variations can be effectuated without departing from the true spirit and scope of the novel concepts of the present film. It is to be understood that no limitation with respect to the specific embodiments illustrated is intended or should be inferred. The disclosure is intended to cover by the appended claims all such modifications as fall within the scope of the claims.

The invention claimed is:

1. A load bearing surface, comprising:
   a woven fabric formed from first fibers and second fibers, at least some of the first fibers being substantially inelastic; and
   a carrier for supporting the woven fabric, the carrier being overmolded onto the woven fabric to secure the fabric thereto,
   wherein at least some of the first fibers are bonded to the carrier so as to remain fixed relative to the carrier during normal loading conditions and during abnormally high loading conditions, and wherein others of the first fibers are bonded to the carrier so as to remain fixed relative to the carrier during normal loading conditions and to move or slip within the carrier during abnormally high loading conditions.

2. The load bearing surface of claim 1, wherein the first fibers are warp fibers and the second fibers are weft fibers.

3. The load bearing surface of claim 1, wherein the at least some of the first fibers are polymeric fibers.

4. The load bearing surface of claim 3, wherein the polymeric fibers are polyester fibers.

5. The load bearing surface of claim 1 wherein at least some of the first fibers are formed from a non-bonding material or wherein a sheath covering the fibers is formed from a non-bonding material aramid.

6. The load bearing surface of claim 5, wherein the non-bonding material is an aramid.

7. The load bearing surface of claim 1 wherein at least some of the second fibers are formed from a block copolymer.

8. The load bearing surface of claim 1, wherein the first fibers have a linear elasticity of no more than about 5 percent and the second fibers have a linear elasticity of about 15-20%.

9. The load bearing surface of claim 1, wherein the first and second fibers are chemically bonded to the carrier.

10. The load bearing surface of claim 1, wherein the first and second fibers are mechanically bonded to the carrier.

11. The load bearing surface of claim 1, wherein the first fibers bonded to the carrier to move or slip within the carrier during abnormally high loading conditions include a mechanical stop on the fibers beyond the carrier.

12. The load bearing surface of claim 11, wherein the mechanical stop is an enlarged portion of the fiber.

13. The load bearing surface of claim 11, wherein the mechanical stop is a knot in the fiber.

14. A load bearing surface, comprising:
   a woven fabric surface; and
   a carrier overmolded onto the fabric surface,
   wherein portions of the woven fabric are bonded to the carrier so as to remain fixed relative to the carrier during normal loading conditions and during abnormally high loading conditions, and wherein other portions of the woven fabric are bonded to the carrier so as to remain fixed relative to the carrier during normal loading conditions and to move or slip within the carrier during abnormally high loading conditions.

15. The load bearing surface of claim 14, wherein the portions of the woven fabric that are bonded to the carrier to move or slip within the carrier during abnormally high loading conditions are formed from substantially inelastic fibers having a linear elasticity of no more than about 5%.

16. The load bearing surface of claim 15, wherein the inelastic fibers are polyester fibers.

17. The load bearing surface of claim 16 wherein the polyester fibers are formed from an non-bonding material or wherein a sheath covering the fibers is formed from a non-bonding material.

18. The load bearing surface of claim 17, wherein the non-bonding material is an aramid.

19. The load bearing surface of claim 1, wherein the first fibers have a linear elasticity of no more than about 5 percent and the second fibers have a linear elasticity of about 15-20%.

20. The load bearing surface of claim 1, wherein the carrier is configured for mounting in a seat bottom, a seat back or a head rest.

21. A load bearing surface, comprising:
a woven fabric surface; and
a carrier overmolded onto the fabric surface,
wherein portions of the woven fabric are bonded to the carrier so as to remain fixed relative to the carrier during normal loading conditions and during abnormally high loading conditions, and wherein other portions of the woven fabric are bonded to the carrier so as to remain fixed relative to the carrier during normal loading conditions and to rupture during abnormally high loading conditions.

22. The load bearing surface of claim 21, wherein the portions of the load bearing surface bonded to the carrier so as to rupture during abnormally high loading conditions are configured to rupture at different loading conditions than others of the portions of the load bearing surface bonded to the carrier so as to rupture during abnormally high loading conditions.

\* \* \* \* \*